United States Patent
Kazumi et al.

[11] Patent Number: 6,140,635
[45] Date of Patent: *Oct. 31, 2000

[54] INCLINATION DETECTING OPTICAL SENSOR AND A PROCESS FOR PRODUCING THE SAME

[75] Inventors: Morimoto Kazumi; Nakai Kenichi; Sano Masashi, all of Kyoto, Japan

[73] Assignee: Rohm Co., Ltd., Kyoto, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/765,191
[22] PCT Filed: Feb. 20, 1996
[86] PCT No.: PCT/JP96/00381
§ 371 Date: Jan. 2, 1997
§ 102(e) Date: Jan. 2, 1997
[87] PCT Pub. No.: WO96/26416
PCT Pub. Date: Aug. 20, 1996

[30] Foreign Application Priority Data

Feb. 22, 1995 [JP] Japan ................................. 7-033845
Oct. 9, 1995 [JP] Japan ................................. 7-261360

[51] Int. Cl.$^7$ ................................................ G01D 5/34
[52] U.S. Cl. ................ 250/231.1; 250/221; 200/61.45 R
[58] Field of Search ........................... 250/231.1, 221, 250/229, 239; 340/689; 200/61.45 R; 438/24, 25, 26

[56] References Cited

U.S. PATENT DOCUMENTS 5,202,559  4/1993  Durst ........................... 250/231.1
5,373,153  12/1994  Cumberledge et al. .......... 250/231.1

FOREIGN PATENT DOCUMENTS

5167098  7/1993  Japan.
6045637  2/1994  Japan.

*Primary Examiner*—Seungsook Ham
*Assistant Examiner*—Kevin Pyo
*Attorney, Agent, or Firm*—BakerBotts, LLP

[57] ABSTRACT

It is an object of the present invention to provide an optical sensor that has a simple structure and which yet enables positive detection of the inclination of an object of interest, and also to provide a process for producing the same. The improved sensor comprises a light-emitting element, a light-receiving element, a body having an inclined surface formed between the two elements, a lid fitted over the body, and a sphere placed between the body and the lid in such a way that it is capable of movement down the inclined surface. In the process, a light-emitting device and a light-receiving device, both subjected to primary molding, are respectively set between the lower and the middle part of a split mold and between the middle and the upper part of the mold; secondary molding is then performed by injecting an opaque resin into the cavity defined by the lower, middle and upper parts of the mold.

10 Claims, 7 Drawing Sheets

PRIOR ART

INCLINATION DETECTING OPTICAL SENSOR AND A PROCESS FOR PRODUCING THE SAME

TECHNICAL FIELD

The present invention relates to an optical sensor for detecting the inclination of an object.

BACKGROUND ART

A widely known type of optical sensor is a photointerrupter that comprises a light-emitting device and a light-receiving device for receiving the light from said light-emitting device and which checks for the presence of a light-shielding object between the two devices by determining whether the light generated from the light-emitting device is interrupted by the object.

Figure 11:
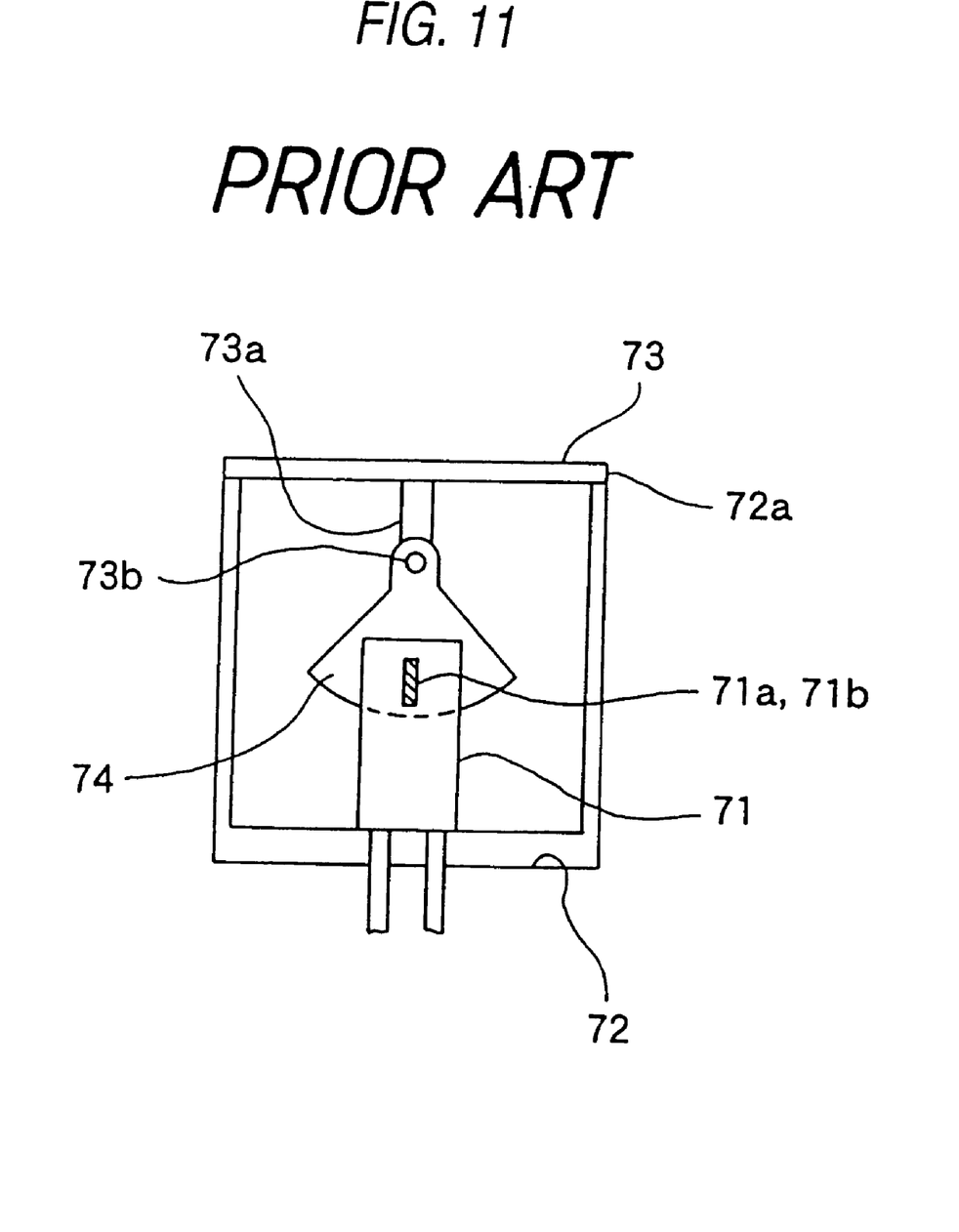
FIG. 11 is a sectional view of the structure of a prior art inclination sensor.

A conventional type of inclination detecting sensor that adopts a photointerrupter is shown schematically in FIG. 11 and comprises the following components: photointerrupter 71 consisting of a light-emitting device 71a and a light-receiving device 71b that is provided in a face-to-face relationship with the device 71b in such a way as to be capable of receiving the light issuing from it; a resin-molded lower case 72 with the top 72a being open to accommodate the photointerrupter 71; an upper case 73 fitted on the top 72a of the lower case 72; and a light-shielding sector 74 adapted to swing between the light-emitting and receiving devices 71a and 71b about a shaft 73b that is supported on a shaft bearing 73a directed downward from the upper case 73 to extend into the lower case 72.

In this type of optical sensor, the light shield 74 supported on the bearing 73a of the shaft 73b is subject to the gravitational effect and normally positioned below the shaft 73b. For its operation, the sensor is either carried or fixed on an object which to be is checked for the occurrence of inclination greater than a certain angle. If the object and, hence, the sensor is either in a level position or inclined at an angle not exceeding a specified value, the light issuing from the light-emitting device 71a toward the light-receiving device 71b has its optical path blocked by the light shield 74 and is not picked up by the light-receiving device 71b. On the other hand, if the object is inclined in either direction to exceed the specified angle, the light shield 74 is accordingly displaced in position relative to the photointerrupter 71 fixed to the lower case 72 and the light issuing from the device 71a travels uninterrupted by the shield 74 and it is picked up by the light-receiving device 71b, whereupon an electric current flows between the associated lead terminals to enable the detection of the inclination of the object.

With the recent advances in the technologies of semiconductors and optical devices, the demand for optical sensors of the above-described type that employ a photointerrupter has increased, requiring not only a further reduction in the number of parts to be assembled but also the adoption of a simplified fabrication process.

In fact, however, the conventional optical sensors requires that the upper case 73 be equipped with the bearing 73a for enabling the provision of the light shield 74. What is more, the light shield 74 which has a specific form adapted for the detection of inclination must either be provided integrally with the shaft 73b or made as a separate member and thereafter connected to the latter in the assembling step. This increases the complexity of mechanical design, making it difficult to reduce the number of parts below a certain level. It is also difficult to simplify the fabrication process beyond a certain level.

DISCLOSURE OF INVENTION

It is an object of the present invention to provide an optical sensor that is simple in design and which yet enables positive detection of the inclination of an object of interest, and also to provide a process for producing the same.

This object of the invention can be attained by an inclination detecting optical sensor comprising:
 a light-emitting element;
 a light-receiving element for receiving the light from the light-emitting section;
 a body having an inclined surface formed between the light-emitting and light-receiving elements;
 a lid fitted on the body; and
 a sphere placed between the body and the lid in such a way that it is capable of movement down the inclined surface.

In a preferred embodiment, the light-emitting and receiving elements are provided in the central part of the body along the inclined surface on opposite sides thereof.

In another preferred embodiment, the light-emitting and receiving elements are provided near the end portions of the body along the inclined surface on opposite sides thereof.

This object of the invention can also be attained by a process for producing an inclination detecting sensor comprising the steps of:
 providing a light-emitting and a light-receiving device that are each formed by applying primary molding of a transparent resin to a semiconductor chip mounted to establish electrical connection to leads at an end thereof;
 applying secondary molding of an opaque resin to said light-emitting and receiving devices so as to form a body having a hollow space defined by an inclined surface between said two devices;
 placing a sphere into said hollow space, and
 fitting a lid on said body in such a way as to close said hollow space.

In a preferred embodiment, secondary molding is performed by filling a cavity with the opaque resin, the cavity being defined by an upper, a middle and a lower part of a split mold, with either one of the light-emitting and receiving devices being positioned between the lower and middle parts whereas the other is positioned between the upper and middle parts.

In a more preferred embodiment, secondary molding is performed with a split mold having two middle parts, one of which has a molding surface with a projecting part that provides a recess in the body while the other has a molding surface that provides outer surfaces for the body.

BEST MODE FOR CARRYING OUT THE INVENTION

Embodiments of the inclination detecting optical sensor according to the present invention will now be described in detail with reference to accompanying drawings.

Figure 1:
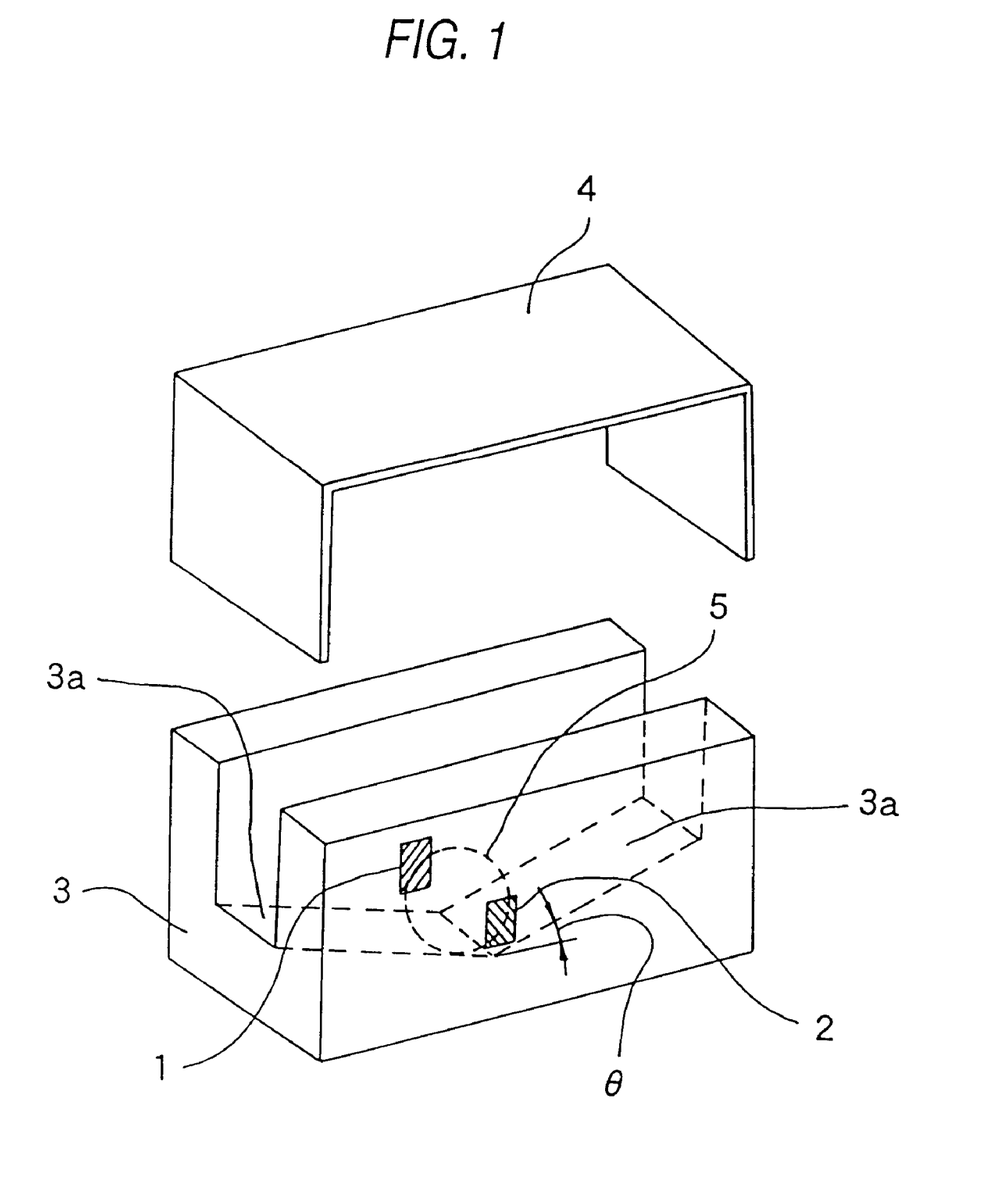
FIG. 1 is a perspective view showing an inclination detecting optical sensor according to the first embodiment of the invention, with the lid detached from the body.

FIG. 1 shows schematically the construction of an optical sensor according to the first embodiment of the invention. As shown, the sensor comprises a light-emitting element 1 that emits light in response to a supplied electric signal, a light-receiving element 2 provided in a face-to-face relationship with the light-emitting element 1 such as to receive the light from the element 1, a body 3 that fixes both the light-emitting element 1 and the light-receiving element 2 by sealing with an opaque resin and which is so formed as to provide an inclined surface 3a between the two elements, a lid 4 fitted over the body 3, and a sphere 5 which is accommodated between the body 3 and the lid 4 in such a way that it is capable of movement down the inclined surface 3a.

Figure 2:
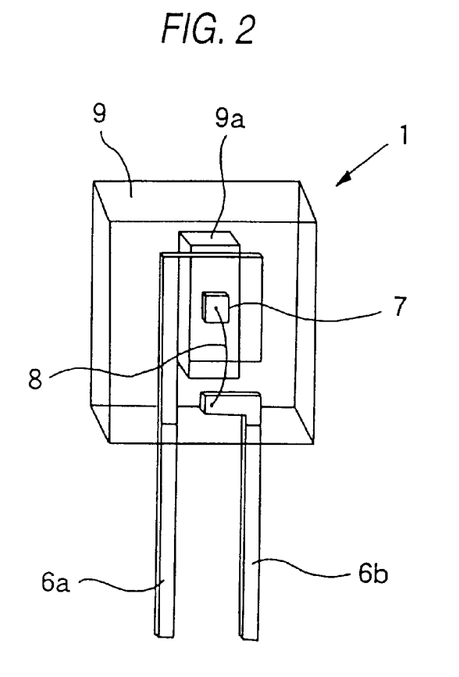
FIG. 2 is a perspective view of the light-emitting element for use in the optical sensor shown in FIG. 1.

As shown specifically in FIG. 2, the light-emitting element 1 comprises a pair of lead electrodes 6a and 6b which are each made of a conductor such as Fe, a light-emitting diode 7 bonded to a tab at the distal end of lead electrode 6a by means of Ag paste, and a Au wire 8 establishing electrical connection between the light-emitting diode 7 and the other lead electrode 6b. The diode 7 and the Au wire 8 are sealed with a transparent resin together with the distal ends of lead electrodes 6a and 6b to form a sealed package 9. The package 9 has a rectangular strip 9a formed near the diode 7 to protrude in forward direction so as to provide a window (to be described later) in the body 3 which is made of an opaque resin.

The light-receiving element 2 is constructed in the same way as the light-emitting element 1, except that the light-emitting diode is replaced by a phototransistor which will generate a voltage between the associated lead electrodes upon illumination with light. Therefore, the light-receiving element 2 is not described here in detail.

Figure 3:
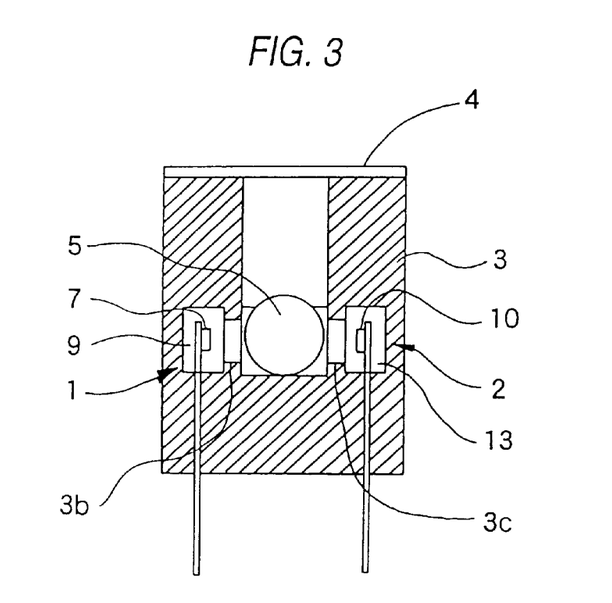
FIG. 3 is a cross section of the sensor shown in FIG. 1.

As shown by cross section in FIG. 3, the body 3 which is made of an opaque resin has a window 3b formed on the light-emitting element side in registry with the projection 9a on the sealed package 9 in such a way that the light issuing from the light-emitting diode 7 can pass through the projection 9a toward the light-receiving element 2. The body 3 also has a window 3c formed on the light-receiving element side in registry with the projection on a sealed package 13 in such a way that the light from the light-emitting diode 7 can be received by the phototransistor 10.

The body 3 has two inclined surfaces 3a which form a specified angle Θ with respect to a reference plane (or a level plane) on which the optical sensor is to be carried. In FIG. 1, the inclined surfaces 3a are provided symmetric with each other but this is not the sole case of the invention and a single inclined surface or two asymmetric inclined surfaces may be provided depending upon the specific object of use of the sensor or its design specifications. Needless to say, the inclined surfaces may partly or entirely be curved.

The first embodiment refers to the case where the light-emitting element 1 and the light-receiving element 2 which constitute a photointerrupter are sealed in an opaque resin together with the body 3 in which the inclined surfaces 3a are formed. Alternatively, that part of the body 3 in which the inclined surfaces are to be formed may be prepared separately from the other parts and thereafter combined with the latter.

Thus, the optical sensor according to the first embodiment of the invention comprises the light-emitting element 1, the light-receiving element 2 for receiving the light from the element 1, the body 3 having the inclined surfaces 3a provided between the two elements, the lid 4 fitted over the body 3, and the sphere 5 (typically made of steel) which is accommodated between the body 3 and the lid 4 in such a way that it is capable of movement down the inclined surfaces 3a. In addition, the light-emitting element 1 and the light-receiving element 2 are provided on opposite sides of the central area where the two inclined surfaces 3a meet. Because of this arrangement, the sphere 5 rests at the joint between the two inclined surfaces 3a if the inclination of the object carrying the sensor does not exceed angle Θ. As a result, the light issuing from the light-emitting element 1 is interrupted by the sphere 5 and does not reach the light-receiving element 2.

If, on the other hand, the object is inclined in either direction (clockwise or counterclockwise) to exceed angle Θ, the sphere will move in the direction of inclination and, hence, the light issuing from the light-emitting element 1 travels uninterrupted by the sphere 5 to reach the light-receiving element 2, where it is picked up as a detection electric signal.

In this way, the optical sensor according to the first embodiment of the invention insures that the inclination of the object carrying the sensor can be easily detected by means of an electric signal that is generated if the light-receiving element 2 picks up the light issuing from the light-emitting element 1.

An optical sensor according to the second embodiment of the invention will now be described with reference to FIG. 4. As shown, the sensor is constructed in the same way as in the first embodiment except that two pairs of light-emitting and receiving elements, one consisting of a light-emitting element 11a and a light-receiving element 12a and the other consisting of 11b and 12b, are provided in the two end portions of the body 3.

Thus, the optical sensor according to the second embodiment of the invention has the pair of light-emitting element 11a and light-receiving element 12a in one end portion of the body 3 and the pair of light-emitting element 11b and light-receiving element 12b in the other end portion. If the object on which the sensor is carried is inclined at a small angle that does not exceed the angle Θ the inclined surfaces 3a form with the reference or level plane, the sphere 5 rests in the central position of the body which is indicated by a solid line in FIG. 4. As a result, the light-issuing from the light-emitting elements 11a and 11b is picked up by the corresponding light-receiving elements 12a and 12b, whereupon an electric current is generated from the light-receiving elements.

Figure 4:
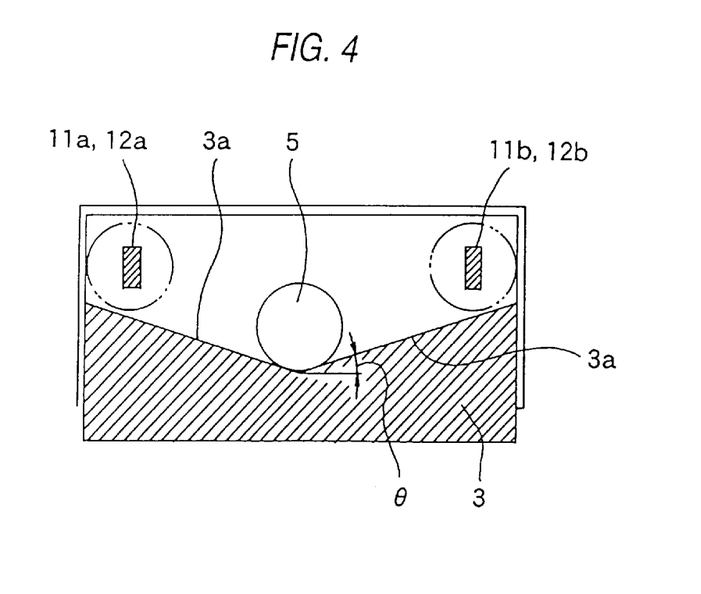
FIG. 4 is a longitudinal section of an inclination detecting optical sensor according to the second embodiment of the invention.

If the object carrying the sensor is inclined in either direction, say counterclockwise, to exceed the angle Θ, the sphere 5 moves to the left in FIG. 4 and prevents the light-receiving element 12a from picking up the light issuing from the light-emitting element 11a and no electric current will be generated from the element 12a. If the object is inclined clockwise to exceed the angle Θ, the sphere 5 will move to the right and prevents the other light-receiving element 12b from picking up the light issuing from the light-emitting element 11b and no current will be generated from the element 12b.

Thus, according to the second embodiment of the invention, one can determine the direction in which the object of interest has been inclined to exceed a specified angle by checking which of the two light-receiving elements 12a and 12b generates an electric current.

A third embodiment of the invention as it relates to an inclination detecting sensor are described below in detail with reference to FIGS. 5–9.

To begin with, the structure of an inclination detecting sensor fabricated by the invention process will now be described.

Figure 5:
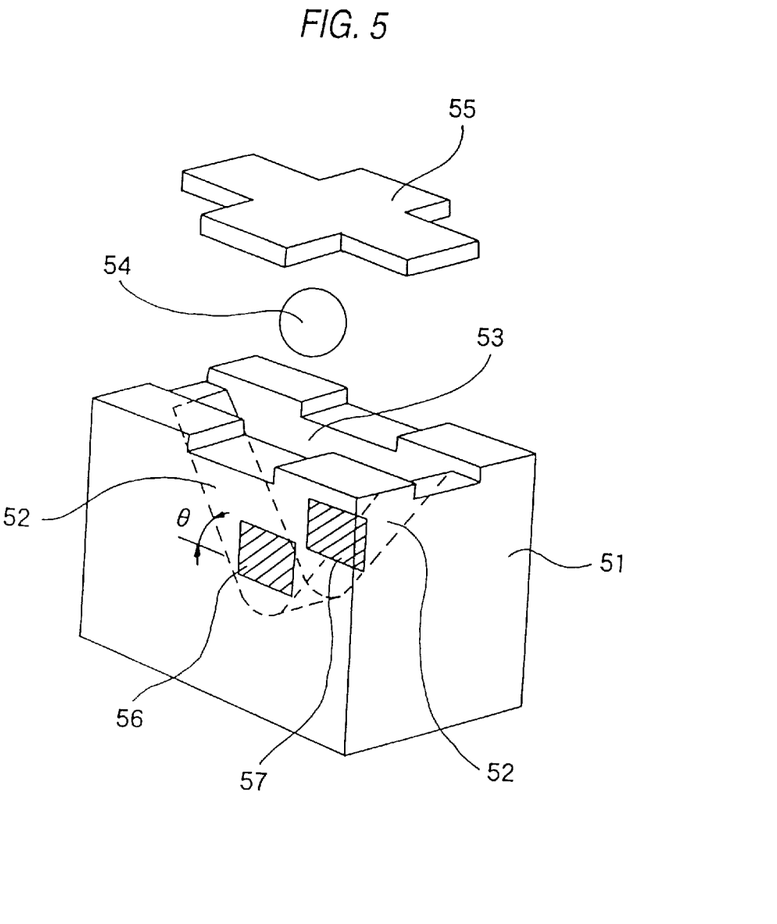
FIG. 5 is a perspective view showing the principal part of an inclination detecting sensor according to the third embodiment of the invention, with the lid detached from the body.

As shown in FIG. 5, the sensor comprises a body 51 made of an opaque resin, a hollow space 53 formed within the body 51 and defined by two opposed inclined surfaces 52 that are formed in the upper part of the body 51, a sphere 54 placed into the hollow space 53 in such a way that it is capable of movement down either of the inclined surfaces 52, a lid 55 secured to the body 51 in such a way as to close the hollow space 53 containing the sphere 54, and a light-emitting device 56 and a light-receiving device 57 that are positioned within the body 51 in planes that hold the inclined surfaces 52 therebetween and that are symmetric with the sphere 54 positioned between said surfaces. In FIG. 5, the light-emitting and receiving devices are hatched for the sake of clarity. For protection against corrosion, the sphere 54 is preferably made of stainless steel but this is not the sole case of the invention. The lid 55 is first formed as a separate member from the body 51 and it can then be fitted into the top surface of the body 51. As will be mentioned later in this specification, the lid 55 may be formed of an opaque resin as an integral part of the body 51. In this case, the lid 55 is bent down to be fitted into the top surface of the body 51.

Figure 6:
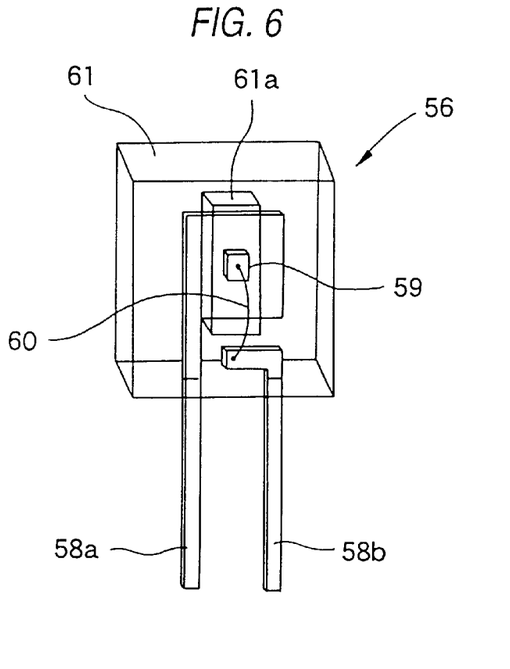
FIG. 6 is a perspective view of the light-emitting device in the sensor shown in FIG. 5.
Figure 7:
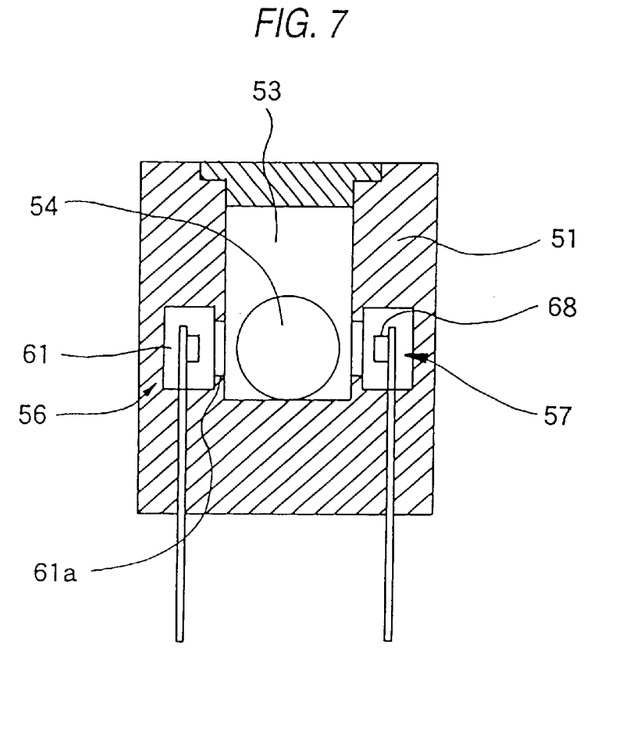
FIG. 7 is a cross section of the sensor shown in FIG. 5.

As shown specifically in FIG. 6, the light-emitting device 56 comprises a pair of lead electrodes 58a and 58b which are each made of a conductor such as Fe, a light-emitting diode 59 bonded to a tab at the distal end of lead electrode 58a by means of Ag paste, and a Au wire 60 establishing electrical connection between the light-emitting diode 59 and the other lead electrode 58b. The diode 59 and the Au wire 60 are primary molded in a transparent resin together with the distal ends of lead electrodes 58a and 58b to form a sealed package 61. The package 61 has a rectangular strip 61a formed near the diode 59 to protrude in forward direction. As best shown in FIG. 7 which is a cross section of the sensor, the package 61 is given secondary molding in an opaque resin to form the body 51 such that a light-passing window is formed in the inner surface of the body to be contiguous to the projection 61a, thus allowing the diode 59 to emit light toward the hollow space 53 in the body 51 via the window.

The light-receiving device 57 is constructed in the same way as the light-emitting device 56, except that the light-emitting diode is replaced by a phototransistor 68 which will cause an electric current to flow between the associated lead electrodes upon illumination with light. Therefore, the light-receiving device 57 is not described here in detail.

Figure 8:
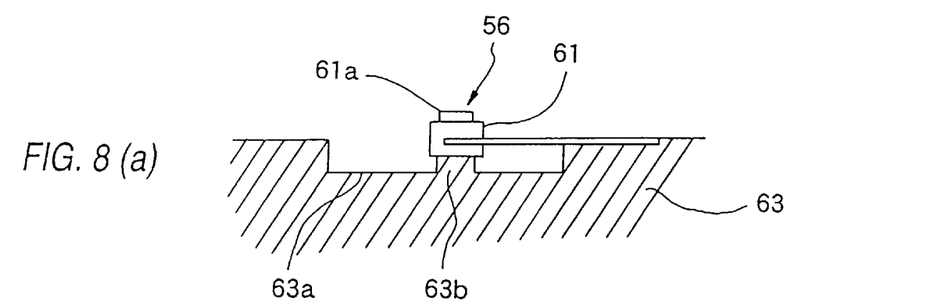
FIGS. 8(a), 8(b), 8(c) and 8(d) shows a fabrication sequence for the sensor of FIG. 5.

The process for producing the sensor will now be described with reference to FIGS. 7 and 8.

First, a light-emitting and a light-receiving device are provided in a primary molded form. Then, these devices are subjected to secondary molding in an opaque resin according to the following procedure.

A split mold consisting of an upper, a middle and a lower part is provided. The split mold is for forming a body in which both devices are to be sealed and fixed. As shown in FIG. 8(a), the primary molded light-emitting device 56 is set on the lower part of the mold, with the projection 61a facing up. The lower part 63 has a molding surface 63a that defines the outer surfaces of the body including one lateral surface and which is continuous to a ridge 63b. The vertical position of the package 61 of the device 56 is determined by the ridge 63b which supports its back side.

With the light-emitting device 56 set on the lower part 63, two sections 64a and 64b of the middle part are set in registry with the lower part 63 such that the device 56 is held between each section of the middle part and the lower part as shown in FIG. 8(b). Stated more specifically, the first section 64a is set in such a way that the distal ends of lead electrodes 58a and 58b to the device 56 are held between the first section 64a and the lower part 63 and that the outer surfaces of the body including the bottom surface will be defined. The second section 64b is set in a face-to-face relationship with the first section 64a such that the projecting part formed at the distal end contacts the projection 61a of the transparent resin package of the device 56 and that the body is provided with a hollow space defined by opposed inclined surfaces.

With the first and second sections 64a and 64b of the middle part being thus set in position, the light-receiving device 57 is set on the other side of the middle part in such a position that it is symmetric with the light-emitting device 56 as shown in FIG. 8(c). Stated more specifically, the light-receiving device 57 is set in such a way that the distal ends of the associated lead electrodes will lie on the first section 64a whereas the projection of the transparent resin package of the device 57 contacts the projecting part of the second section 64b.

With the light-receiving device 57 being thus set on the sections 64a and 64b of the middle part of the split mold, the upper part 65 of the mold which is formed symmetrically with the lower part 63 is set on the sections 64a and 64b of the middle part in such a way that the light-receiving device 57 is held between the upper part 65 and each of the sections 64a and 64b as shown in FIG. 8(d). Like the lower part 63, the upper part 65 has a molding surface 65a that defines the outer surfaces of the body including the other lateral surface and which is continuous to a ridge 65b. The vertical position of the sealed package of the light-receiving device 57 is determined by the ridge 65b which supports its back side.

The lower part 63, the sections 64a and 64b of the middle part and the upper part 65 which have been set in the manner just described above define a cavity for the secondary molding to be performed with an opaque resin. The cavity is filled with an opaque resin that is injected through a runner (not shown) typically formed between the lower part 63 and the middle part 64a or 64b. The injected resin is hardened to form a body in which both the light-emitting and receiving devices are securely sealed and which has a hollow space formed therein. The opaque resin to be used in the secondary molding may be a polycarbonate or ABS resin.

After the opaque resin hardens, the respective parts of the split mold are removed to leave behind the body having the light-emitting and receiving devices 56 and 57 fixed therein.

Figure 9:
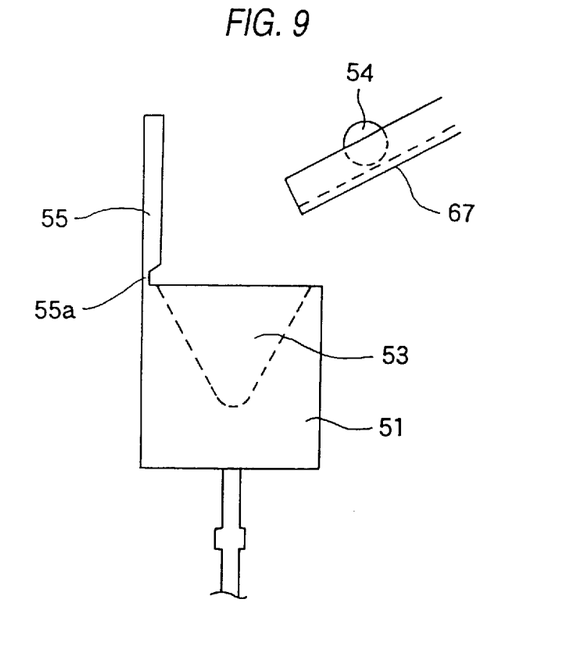
FIG. 9 illustrates how a sphere is loaded into the sensor of the invention with the lid being then fitted on the body.

The thus formed body 1 has the hollow space 53. As shown in FIG. 9, a sphere 54 is slid down a chute 67 to drop into the space 53. Thereafter, the lid 55 is fitted on the body 1 to close the hollow space 53, thus providing an inclination detecting sensor according to the invention. For mass production of sensors, a number of spheres are accommodated in a parts feeder connected to a chute equipped with a shutter and the spheres are successively slid down the chute to drop into the respective hollow spaces in an array of bodies.

The embodiment shown in FIG. 9 differs from the case of FIG. 5 in that the lid 55 is formed as an integral part of the body 51 and connected thereto via a joint 55a such that it can be fitted onto the body 51. The order to fit it onto the body 51, the lid 55 may be bent down by means of a metallic cylindrical roller that is pressed against the lid from left to right in FIG. 9.

In the embodiment described above, the light-emitting device is set on the lower part of the split mold whereas the light-receiving device is set on the middle part. Needless to say, this is not the sole case of the invention and the secondary molding may be performed with the light-receiving device being set on the lower part of the mold and the light-emitting device on the middle part.

The inclination detecting sensor thus constructed operates in the following manner. Suppose the case where the sensor is carried or fixed on an object which is to be checked for the occurrence of inclination greater than a certain angle.

If the object and, hence, the sensor is inclined at an angle not exceeding a specified value, say, $\Theta$ (see FIG. 5) with respect to a level or reference plane, the sphere 54 rests in the reference position between two inclined surfaces 52 and the light issuing from the light-emitting device 56 is blocked by the sphere 54 and will not reach the light-receiving device 57.

If the sensor is inclined in either direction to exceed angle $\Theta$, the sphere 54 will move down one of the inclined surfaces 52 such that it is no longer situated between the light-emitting device 56 and the light-receiving device 57. As a result, the light from the device 56 is transmitted direct to the light-receiving device 57 and an electric current corresponding to the amount of light reception is generated from the phototransistor in the device 57.

If the quantity of the current generated from the light-receiving device 57 is detected by electrical means, one can easily determine whether the object of interest has been inclined to exceed angle $\Theta$.

In the embodiment described above, the body of the sensor has two opposed inclined surfaces but this is not the sole case of the invention and a single inclined surface may of course be provided to enable the detection of an inclination in a specified direction.

Figure 10:
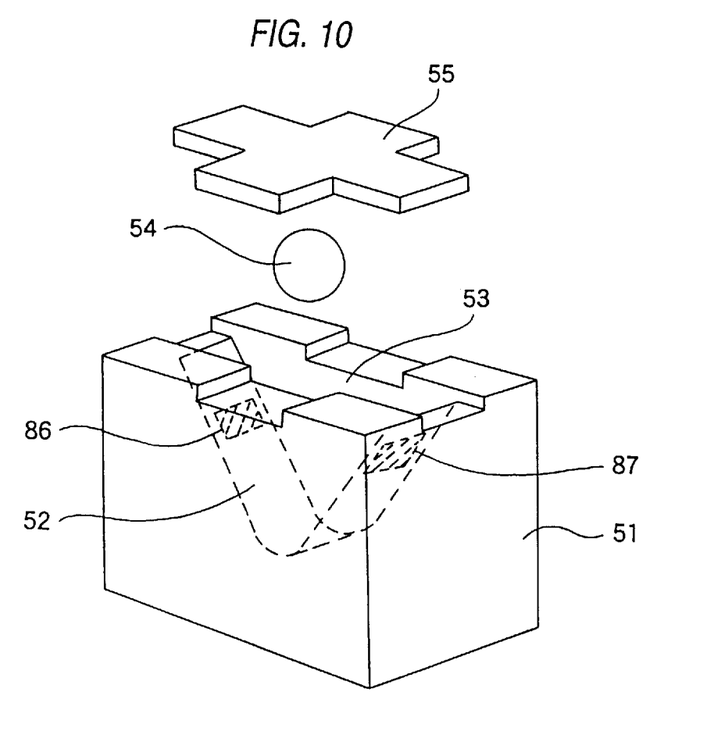
FIG. 10 is a perspective view showing the principal part of an inclination detecting sensor according to the modification of the third embodiment.

In the third embodiment according to the present invention, as shown in FIG. 5 the light-emitting device 56 and the light-receiving device 57 are positioned within the body 51 in planes that hold inclined surfaces 52 therebetween and that are symmetric with the sphere 54 positioned between the surfaces. On the other hand, as shown in FIG. 10 the light-emitting device 86 and the light-receiving device 87 may be positioned on the inclined surfaces 52 so as to be confronted with each other and in parallel with a horizontal line.

Industrial Applicability

The inclination detecting optical sensor according to the invention is operationally carried or fixed on an object of interest which is to be checked for the presence of an inclination greater than a certain angle. If the object and, hence, the sensor is inclined at an angle not exceeding a specified value $\Theta$ the inclined surface forms with a reference plane or a level plane), the sphere is located at the center, or in the area where the two inclined surfaces meet. If the sensor is inclined to exceed angle $\Theta$, the sphere will move in either direction (clockwise or counterclockwise) toward the end of the inclined surface down which the sphere rolls.

If the light-emitting element and the light-receiving element for receiving the light from the light-emitting element are provided in the central part of the body along the inclined surface on opposite sides thereof, the light issuing from the light-emitting element is blocked by the sphere and does not reach the light-receiving element if the inclination of the sensor is smaller than the specified angle $\Theta$. On the other hand, if the sensor is inclined to exceed angle $\Theta$, the sphere will move toward the lowermost end of the inclined surface in the body; hence, the light from the light-emitting element travels unimpeded by the sphere to reach the light-receiving element, from which it is picked up as a detection electric signal.

If desired, two pairs of the light-emitting and receiving element, may be provided near the end portions of the body along the inclined surface on opposite sides thereof. In this embodiment, the light issuing from each light-emitting element travels unimpeded by the sphere if the inclination of the sensor is smaller than angle $\Theta$ and the light is packed up by the corresponding light-receiving element. On the other hand, if the sensor is inclined to exceed angle $\Theta$, the sphere will move toward the end of the inclined surface down which the sphere rolls and the light issuing from the light-emitting element provided in that end portion is blocked by the sphere and does not reach the corresponding light-receiving element which, hence, generates no electric signal; however, the light from the other light-emitting element is picked up by the corresponding light-receiving element, which generates a detection electric signal.

Thus, by checking for the generation of an electric signal from the light-receiving element in response to the inclination of the sensor, one can determine if the object of interest has been inclined to exceed a specified angle (in the first embodiment) or determine the direction in which the inclination has occurred (in the second embodiment). The invention enables such detection with a simple apparatus design and in a positive way.

Further, as described in detail on the foregoing pages, the invention provides a simple and easy process for producing a sensor that is simple in construction and which yet enables positive detection of the inclination of an object of interest.

The sensor produced by the process of the invention comprises a body that has a sphere fitted into a hollow space formed of an inclined surface within the body. This contributes simplicity and compactness to the sensor. What is more, the only moving part of the sensor is the sphere which moves down the inclined surface and, hence, the sensor can be used with little possibility of the occurrence of operational defects such as the moving part sticking in another part. This enables the sensor to detect inclinations with higher reliability.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process for producing an inclination detecting sensor comprising the steps of:

provic a light-emitting device and a light-receiving device;

molding an opaque resin to said light-emitting and receiving devices so as to form a body having a hollow space defined by an inclined surface between said two devices;

placing a sphere into said hollow space; and fitting a lid on said body in such a way as to close said hollow space;

wherein the inclined surface provides a rest position for the sphere when the body having the hollow space is in a vertical orientation and permits the sphere to move away from the rest position when the body is inclined by a selected angle from the vertical orientation and wherein the light-emitting device and the light-receiving device are mounted adjacent to the hollow space at a location spaced from the rest position of the sphere so that substantially all of a light beam passing from the light-emitting device to the light-receiving device is blocked by the sphere to detect the presence of the sphere when it reaches the selected location but substantially none of the light beam passing from the light-emitting device to the light-receiving device is blocked by the sphere when it is in the rest position.

2. A process according to claim 1, wherein said light-emitting device and said light-receiving device are each formed by applying primary molding of a transparent resin to a semiconductor chip mounted to establish electrical connection to leads at an end thereof.

3. A process according to claim 1, wherein said molding step is performed by filling a cavity with the opaque resin, said cavity being defined by an upper, a middle, and a lower part of a split mold, with either one of said light-emitting and receiving devices being positioned between said lower and middle parts whereas the other is positioned between said upper and middle parts.

4. A process according to claim 1, wherein said molding step is performed with a split mold having two middle parts, one of which has a molding surface with a projecting part that provides a recess in the body while the other has a molding surface that provides outer surfaces for the body.

5. An inclination detecting optical sensor comprising:

a housing formed with a passage which inclines upwardly from a rest position within the housing;

a body disposed within the passage which is normally retained in the rest position when the housing is disposed in a vertical orientation and which is movable along the passage when the housing is titled away from the vertical orientation by an angle greater than a selected angle; and optical sensor means providing a light beam passing within the passage directly from a light source to a detector at a position where it is not intercepted by the body when the body is in the rest position so that substantially all of the light beam is detected by the detector but is intercepted by the body when the body is at a selected location spaced from the rest position.

6. An inclination detecting optical sensor arrangement according to claim 5 wherein the optical sensor means comprises a light-emitting element and a light receiving element which are disposed on opposite sides of the passage at the selected location.

7. An inclination detecting optical sensor arrangement according to claim 5 wherein the passage is inclined upwardly in opposite directions away from the rest position and wherein the optical sensor means include a first optical sensor element providing a light beam at a position spaced in one direction along the passage from the rest position and a second optical sensor element providing a light beam extending through the passage at a position spaced from the rest position in the opposite direction along the passage.

8. An inclination detecting optical sensor arrangement according to claim 5 wherein the passage is inclined upwardly in opposite directions away from the rest position and the optical sensor means includes a light-emitting element adjacent to the passage at a location spaced in one direction from the rest position and a light receiving element at a location adjacent to the passage which is spaced in the opposite direction from the rest position.

9. An inclination detecting optical sensor arrangement according to claim 5 wherein the body is a member which is rollable in the passage.

10. An inclination detecting optical sensor arrangement according to claim 9 wherein the body is a sphere.

* * * * *

UNITED STATES PATENT AND TRADEMARK OFFICE
CERTIFICATE OF CORRECTION

PATENT NO.    : 6,140,635
DATED         : October 31, 2000
INVENTOR(S)   : Morimoto et al.

It is certified that error appears in the above-identified patent and that said Letters Patent is hereby corrected as shown below:

Column 1,
Line 57, "sensors" should read -- sensor --.

Column 10,
Line 9, "titled" should read -- tilted --.

Signed and Sealed this

Sixteenth Day of July, 2002

Attest:

Attesting Officer

JAMES E. ROGAN
Director of the United States Patent and Trademark Office